No. 880,212. PATENTED FEB. 25, 1908.
T. B. HEATHORN.
MEANS FOR PREVENTING SIDE SLIP OF MOTOR VEHICLES.
APPLICATION FILED NOV. 11, 1907.

Witnesses
Frederick Cleveland
Samuel Percival

Inventor
Thomas Bridges Heathorn
by
Wheatley Mackenzie
Attorneys.

UNITED STATES PATENT OFFICE.

THOMAS BRIDGES HEATHORN, OF KNIGHTSBRIDGE, LONDON, ENGLAND.

MEANS FOR PREVENTING SIDE SLIP OF MOTOR-VEHICLES.

No. 880,212.      Specification of Letters Patent.      Patented Feb. 25, 1908.

Application filed November 11, 1907. Serial No. 401,690.

*To all whom it may concern:*

Be it known that I, THOMAS BRIDGES HEATHORN, a subject of the King of Great Britain and Ireland, residing at 10 Wilton Place, Knightsbridge, in the county of London, England, have invented certain new and useful Improvements in Means for Preventing Side Slip of Motor or other Road Vehicles; and I do hereby declare the following to be a full, clear, and exact description of the invention, such as will enable others skilled in the art to which it appertains to make and use the same.

This invention for improvements in means for preventing side slip of motor or other road vehicles has for its object to provide an apparatus of simple construction that shall effectively prevent all lateral deviations of the vehicle due to slipping of the wheels on the road surface and comprises rollers supported in suitable bearings from the underside of the vehicle and provided with helical ribs or projections adapted to roll on the surface of the road, and so opposed as to give a resultant action tending to retain the vehicle in the line of travel.

Figure 1:
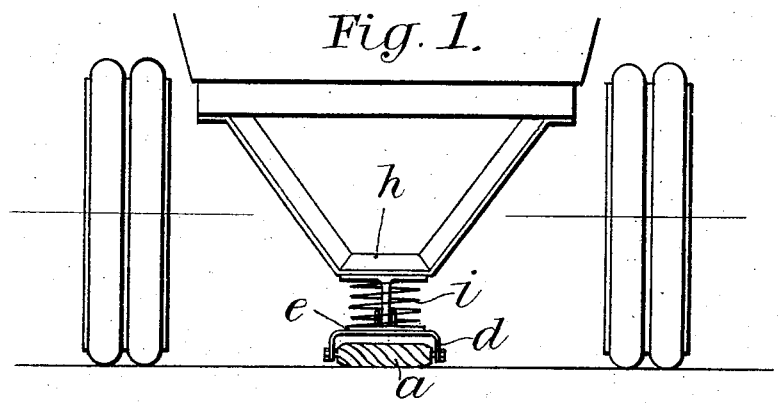
Figure 2:
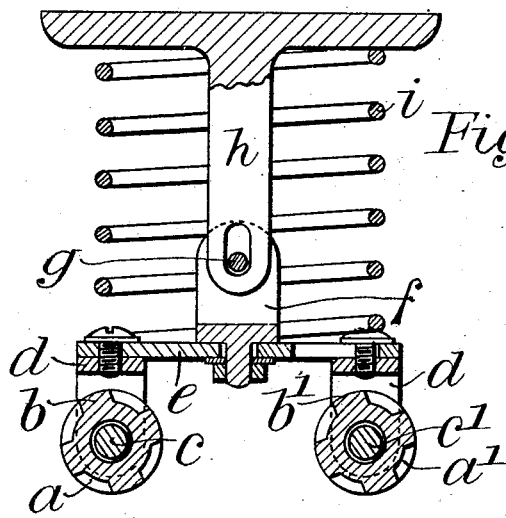
Figure 3:
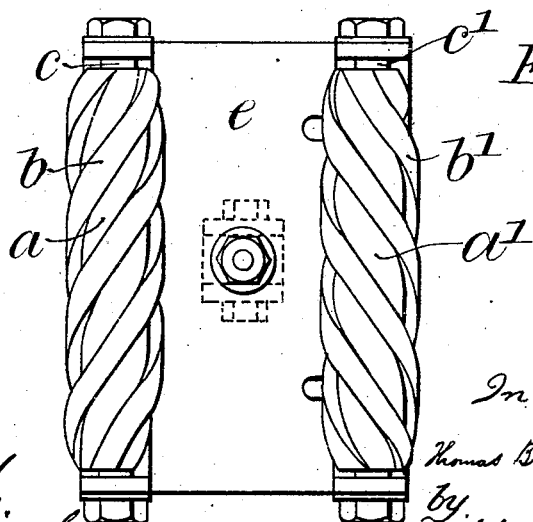

In the accompanying sheet of illustrative drawings Figure 1 is an elevation of an apparatus for preventing side slip constructed according to this invention showing one method of applying the same to a vehicle, Fig. 2 is a vertical section of the improved apparatus taken at right angles to Fig. 1 and on a larger scale, and Fig. 3 is an inverted plan.

As shown the apparatus for preventing side slip of vehicles consists of two rollers $a$ $a'$ formed respectively with right and left hand helical ribs $b$ $b'$ and arranged with their axes parallel to each other, but at right angles to the direction in which the vehicle normally travels. The rollers are mounted to rotate on spindles or axles $c$ $c'$ fixed in brackets $d$ depending from a supporting plate $e$ which is in turn supported by a U piece $f$ and pin $g$ from a slotted depending bracket $h$ suitably supported on the underside of the vehicle. In order to provide a resilient contact between the rollers $a$ $a'$ and the surface of the road the rollers are pressed downwards by a spring $i$ which bears on the plate $e$.

It will be readily understood that the pitch length and form of the helices are capable of considerable variation without departing from this invention, also that the number of helices employed, or the number of sets of helices used on each vehicle and their position may be varied as desired.

In use the helices engage the road surface and their action being opposed, any tendency to slip sidewise in either direction is counteracted by the opposing helix. When the roads are dry or there is no tendency to side slip the rollers may be raised out of contact with the road by any suitable means.

What he claims and desires to secure by Letters Patent is:—

1. An apparatus for preventing side slip of motor or other road vehicles comprising rollers provided with helical ribs or projections adapted to engage the surface of the road and means for supporting the rollers in contact with the road surface.

2. An apparatus for preventing side slip of motor or other road vehicles comprising a pair of rollers provided respectively with right and left hand helical ribs or projections, a depending bracket in which the rollers are mounted with their axes parallel and a spring arranged on the bracket to resiliently press the rollers against the road surface.

In testimony whereof he has affixed his signature, in presence of two witnesses.

THOMAS BRIDGES HEATHORN.

Witnesses:
    T. J. OSMAN,
    JOSEPH LAKE.